(12) United States Patent
Ude et al.

(10) Patent No.: US 9,581,168 B2
(45) Date of Patent: Feb. 28, 2017

(54) CONTROL DEVICE FOR A RADIATOR FAN, RADIATOR FAN ARRANGEMENT AND METHOD

(71) Applicant: Brose Fahrzeugteile GmbH & Co. Kommanditgesellschaft, Wuerzburg, Wuerzburg (DE)

(72) Inventors: Karsten Ude, Hude (DE); Stefan Zick, Volkach (DE)

(73) Assignee: Brose Fahrzeugteile GmbH & Co. Kommanditsellschaft, Wuerzburg, Wuerzburg (DE)

(*) Notice: Subject to any disclaimer, the term of this patent is extended or adjusted under 35 U.S.C. 154(b) by 285 days.

(21) Appl. No.: 14/365,173

(22) PCT Filed: Dec. 6, 2012

(86) PCT No.: PCT/EP2012/005024
§ 371 (c)(1),
(2) Date: Jun. 13, 2014

(87) PCT Pub. No.: WO2013/087164
PCT Pub. Date: Jun. 20, 2013

(65) Prior Publication Data
US 2014/0341751 A1    Nov. 20, 2014

(30) Foreign Application Priority Data

Dec. 14, 2011 (DE) .......................... 10 2011 088 597
Mar. 8, 2012 (DE) .......................... 10 2012 203 663

(51) Int. Cl.
G05D 7/06 (2006.01)
F04D 27/00 (2006.01)
(Continued)

(52) U.S. Cl.
CPC ......... *F04D 27/004* (2013.01); *F04D 19/002* (2013.01); *F04D 27/008* (2013.01);
(Continued)

(58) Field of Classification Search
CPC .............................. H02P 31/00; G05D 7/0617
(Continued)

(56) References Cited

U.S. PATENT DOCUMENTS 6,481,388 B1 * 11/2002 Yamamoto ............. F01P 7/044
                                                                123/41.1
6,483,423 B1 * 11/2002 Han .................... G05B 23/0221
                                                                123/406.65

(Continued)

FOREIGN PATENT DOCUMENTS

| CN | 2192981 Y | 3/1995 |
| CN | 1988361 A | 6/2007 |

(Continued)

OTHER PUBLICATIONS

First Chinese Office Action, including Search Report, for Chinese Patent Application No. 2012800616987, dated Oct. 10, 2015, 13 pages.

(Continued)

*Primary Examiner* — David S Luo
(74) *Attorney, Agent, or Firm* — Westman, Champlin & Koehler, P.A.

(57) ABSTRACT

The present invention relates to a control device for a radiator fan, in particular for a radiator fan of a motor vehicle, having an external control device which is designed to generate a controlled variable for an electric motor of the radiator fan according to a first predefined setpoint value, and having an internal control device which is designed to control the motor current of the electric motor of the radiator fan according to a predefined first motor current maximum (Continued)

value if the controlled variable which is generated by the external control device assumes such a value that the motor current exceeds the predefined first motor current maximum value. The present invention also relates to a radiator fan arrangement and to a method for controlling a radiator fan.

12 Claims, 3 Drawing Sheets

(51) Int. Cl.
    *H02P 6/06*          (2006.01)
    *F04D 19/00*        (2006.01)
    *H02P 31/00*        (2006.01)
    *H02P 23/00*        (2016.01)

(52) U.S. Cl.
    CPC ......... *G05D 7/0617* (2013.01); *G05D 7/0676* (2013.01); *H02P 6/06* (2013.01); *H02P 23/0004* (2013.01); *H02P 23/22* (2016.02); *H02P 31/00* (2013.01)

(58) Field of Classification Search
    USPC .................................................. 318/635, 560
    See application file for complete search history.

(56) References Cited

U.S. PATENT DOCUMENTS

| | | | |
|---|---|---|---|
| 7,782,001 B2 * | 8/2010 | Herwig | ...................... B60J 5/06 318/266 |
| 7,863,839 B2 * | 1/2011 | Schuricht | ................ F01P 7/044 123/41.12 |
| 2004/0104695 A1 | 6/2004 | Hahn et al. | |

FOREIGN PATENT DOCUMENTS

| | | |
|---|---|---|
| CN | 101594104 A | 12/2009 |
| CN | 201699534 U | 1/2011 |
| DE | 30 47 781 A1 | 7/1982 |
| DE | 198 26 458 A1 | 12/1999 |
| DE | 100 24 485 A1 | 11/2000 |
| DE | 100 16 435 A1 | 10/2001 |
| DE | 10 2005 048 451 A1 | 4/2006 |
| DE | 10 2008 058 955 A1 | 6/2009 |
| EP | 0104547 A2 | 4/1984 |
| EP | 2063521 A1 | 5/2009 |
| GB | 2 195 037 A | 3/1988 |
| JP | 2002-530044 A | 9/2002 |
| WO | 02/19510 A1 | 3/2002 |
| WO | 03/015255 A1 | 2/2003 |
| WO | 2006/092265 A1 | 9/2006 |

OTHER PUBLICATIONS

International Search Report and Written Opinion for PCT Application No. PCT/EP2012/005024, dated Jun. 20, 2013, 13 pages.
Search Report for German priority application No. 10 2011 088 597.8, dated Jan. 12, 2012, 4 pages.
Second Office Action, including Search Report, for Chinese Patent Application No. 2012800616987, dated Apr. 26, 2016, 7 pages.

\* cited by examiner

CONTROL DEVICE FOR A RADIATOR FAN, RADIATOR FAN ARRANGEMENT AND METHOD

CROSS-REFERENCE TO RELATED APPLICATION

This Application is a Section 371 National Stage Application of International Application No. PCT/EP2012/005024, filed 6 Dec. 2012 and published as WO 2013/087164 A2 on 20 Jun. 2013, in German, the contents of which are hereby incorporated by reference in their entirety.

FIELD OF THE INVENTION

The present invention relates to a control device for a radiator fan, more particularly for a radiator fan of a motor vehicle. The present invention further relates to a radiator fan arrangement and to a method for controlling a radiator fan.

TECHNICAL BACKGROUND

Fans are required in many technical fields in order to cool installations and systems and to keep the operating temperature thereof within the specified operating temperature range. In vehicles, fans are used for example in combination with a radiator in order to keep the vehicle engine within the specified operating temperature range for the engine and to prevent the engine from overheating.

If a fan of this type is used as a radiator fan in a motor vehicle, a vehicle control system usually presets a desired speed for the radiator fan in the fan control system. The fan control system then controls the radiator fan in a closed-loop manner in such a way that said radiator fan rotates at the predetermined desired speed. As a result, with constant ambient conditions, a constant air flow is generated or a constant air volume is conveyed by the radiator fan.

In such conventional fans, the air flow varies with changes in the ambient conditions. Ambient conditions such as temperature, height above sea level and the like are understood as changing ambient conditions, and these have an effect on the ambient air density.

If a motor vehicle is e.g. at high altitude, the air there is significantly thinner (i.e. less dense) than at sea level. As a result of this, however, the maximum air volume that the radiator fan can provide at the same speed is reduced. This can lead to the radiator fan not being able to provide enough air to cool the engine, even at maximum speed. Consequently, the temperature increases and an emergency operating mode of the radiator fan has to be activated, whereby the fan increases the speed up to an emergency speed. As an alternative, it would also be conceivable to over-dimension the radiator fan for such a case. This, however, would make the production of the radiator fan module as a whole both more difficult and more expensive.

SUMMARY OF THE INVENTION

Against this background, it is therefore an object of the present invention to adapt a radiator fan to different ambient conditions.

This object is achieved according to the invention by a control device having the features of claim 1 and/or by a radiator fan arrangement having the features of claim 1 and/or by a method having the features of the claim.

The following is accordingly provided:

A control device for a radiator fan, more particularly for a radiator fan of a motor vehicle, comprising an external closed-loop control device designed to generate a controlled variable for an electromotor of the radiator fan according to a first predetermined desired value, and an internal closed-loop control device designed for the closed-loop control of the motor current of the electromotor of the radiator fan when the controlled variable generated by the external closed-loop control device takes on such a value that the motor current exceeds the predetermined first motor current maximum value.

A radiator fan arrangement, more particularly for a motor vehicle, comprising a radiator fan which has an impeller and an electromotor for driving the impeller, and comprising a control device according to the invention which is coupled to the radiator fan and designed to control the electromotor of the radiator fan.

A method for controlling a radiator fan of a motor vehicle, more particularly using a control device according to the invention, comprising the steps: generating a controlled variable for an electromotor of the radiator fan according to a first predetermined desired value; controlling, in a closed-loop manner, the motor current of the electromotor of the radiator fan according to a predetermined first motor current maximum value when the controlled variable takes on such a value that the motor current exceeds the predetermined first motor current maximum value.

The concept of the present invention consists in distributing the closed-loop control of the electromotor for a radiator fan to an external closed-loop control device and an internal closed-loop control device. As a result, a radiator fan can be used which can be very flexibly controlled in a closed-loop manner. In addition, the radiator fan according to the invention can be controlled in a closed-loop manner within the total possible speed range of the radiator fan so that e.g. the emergency operating mode of the radiator fan does not become necessary.

Advantageous embodiments and developments of the invention emerge from the additional dependent claims and from the description with reference to the figures of the drawings.

In a first preferred embodiment, the predetermined desired value designates a desired speed. In this case, the external closed-loop control device is designed as a closed-loop speed controller which has a speed detection means designed to detect a speed of the electromotor (10). Closed-loop speed control of this type allows for efficient actuation of the electromotor, in particular in the partial load range of the electromotor. Furthermore, certain speeds of the radiator fan, which can cause resonance in a vehicle and generate bothersome noises as a result, can be prevented by this type of closed-loop control. However, if the speed reaches a value that is so high that the current that the electromotor of the radiator fan would require in order to reach this value exceeds the first maximum value, the electromotor of the radiator fan is controlled based on the current by means of the internal closed-loop control device. By means of this distribution, it can be ensured that the radiator fan applies the power expected by the radiator fan under all the ambient conditions specified for the radiator fan.

In another likewise preferred embodiment, the desired value designates a desired air volume. The external closed-loop control device is designed as a closed-loop air volume controller which has an air volume detection means designed to detect an air volume of the radiator fan. Since the air volume, which a radiator fan moves at a predetermined speed, is dependent on air density, the volume of air moved varies if e.g. the temperature changes or if the radiator fan is operated at high altitudes, e.g. in the region of more than 2000 m, when the fan is operated at the same speed. Closed-loop control of the fan on the basis of the required air volume therefore allows for the provision of a constant air volume and thus a constant cooling power under varying ambient conditions.

In one embodiment, the internal closed-loop control device is designed as a closed-loop current controller having a current sensor. The current sensor is designed for the closed-loop control of the motor current to a constant value such that a current consumed by the electromotor is lower than a maximum permissible current for the power electronics of the control system. This allows a very simple internal closed-loop control to be implemented.

In a further embodiment, the internal closed-loop control device is designed as a closed-loop current controller. The internal closed-loop control device controls the current such that the current consumed by the electromotor briefly exceeds the maximal permissible continuous current for the power electronics of the control system so as to provide an increased air volume. In this case, the internal closed-loop control device is designed to limit the amount of time for which the increased current is consumed such that no damage is caused to the power electronics. This allows for the brief provision of an increased air volume.

In one embodiment, the control device has a second maximum value which presets the maximum value, which can be set, of the controlled variable, the radiator fan being designed such that, at room temperature, the motor current of the electromotor increases to the first maximum value before the electromotor reaches the speed required to set the second maximum value with the radiator fan, the first predetermined desired value (5) being generated depending on the temperature and/or the height above sea level and/or the ambient air density. At room temperature, the air is denser than air at higher temperatures. Therefore, increased power is needed to operate the radiator fan at a predetermined speed at room temperature than at higher temperatures or e.g. greater altitudes. If the first maximum value and the second maximum value are preset such that the radiator fan cannot be operated at the maximum speed e.g. at room temperature, and the maximum speed can only be reached at higher temperatures or at greater altitudes, continuous closed-loop control of the radiator fan speed up to its maximum speed becomes possible, without a radiator fan emergency operating mode becoming necessary.

In one embodiment, the control device has a PWM interface or a digital data interface, in particular a CAN bus interface or a FlexRay interface or an LIN bus interface, which is designed to couple the control system to other vehicle control systems and to receive the desired value from at least one other vehicle control system. This allows a radiator fan to be used in various vehicle architectures and allows the radiator fan to be adapted flexibly to various applications.

The above embodiments and developments can be combined in any conceivable combination, as long as this is reasonable. Further possible embodiments, developments and uses of the invention also include combinations of features of the invention described previously or below with respect to the embodiments, even if not explicitly stated. In this case, a person skilled in the art will more particularly also add individual aspects as improvements or additions to the respective basic form of the present invention.

CONTENT OF THE DRAWINGS

The present invention is explained below in greater detail with reference to embodiments specified in the schematic figures in the drawings, in which.

Figure 1:
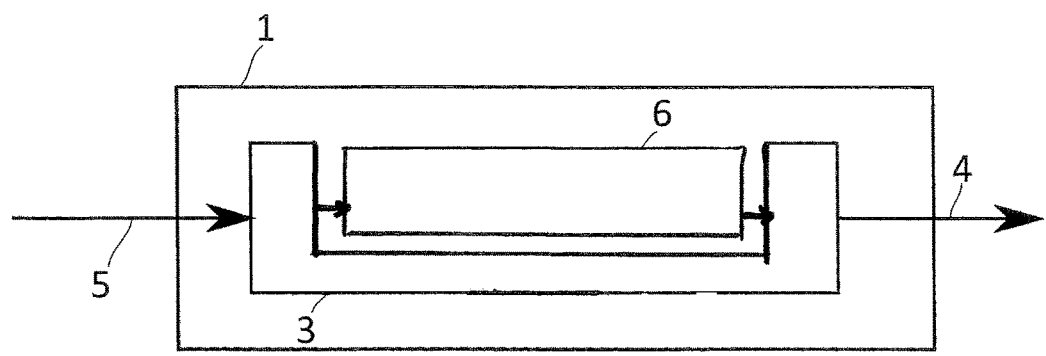
FIG. 1 is a block diagram of an exemplary embodiment of a control device according to the invention.

The accompanying drawings are intended to convey further understanding of the embodiments of the invention. They show embodiments of the invention and, in conjunction with the description, clarify the principles and concepts behind the invention. Other embodiments and many of the advantages mentioned are apparent with respect to the drawings. The elements of the drawings are not necessarily shown true to scale in relation to each other.

In the figures of the drawings, the same elements, features and components, or those serving the same function and having the same effect, are provided with the same reference numerals in each case, unless specified otherwise.

DESCRIPTION OF EMBODIMENTS

FIG. 1 is a block diagram of an exemplary embodiment of the control device 1 according to the invention.

The control means according to the invention is in this case denoted by reference numeral 1. The control device 1 has an external closed-loop control device 3 and an internal closed-loop control device 6.

The external closed-loop control device 3 generates a controlled variable 4 which can be fed to an electromotor 10 of a radiator fan 2 (not shown in FIG. 1). In addition, the external closed-loop control device 3 picks up a predetermined desired value 5, which provides a desired value for the controlled variable 4.

The internal closed-loop control device 6 is provided in the control device 1 between the external closed-loop control device 3 and the output of the controlled variable 4. The internal closed-loop control device 6 is designed to monitor the motor current of the electromotor 10. Additionally, if the motor current exceeds a predetermined first maximum value, the internal closed-loop control device 6 is designed to replace the controlled variable 4, generated by the external closed-loop control device 3, with a controlled variable 4 generated by means of closed-loop current control. In this process, the internal closed-loop control device 6 implements a closed-loop current control such that the motor current is controlled to a constant current value if the motor current exceeds the predetermined first maximum value as a result of the predetermined desired value 5.

The control device 1 has a PWM input for the predetermined desired value 5. This can be generated as a PWM-modulated signal in a very simple manner e.g. in a motor vehicle by a suitable control device.

Furthermore, the external closed-loop control device 3 and the internal closed-loop control device 6 are constructed from discrete circuitry elements. In other embodiments, the external closed-loop control device 3 and the internal closed-loop control device 6 can be stored as computer program products, for example in a storage unit of the control device 1, and can be executed by a processing device or a control unit of the control device 1 provided specifically for this purpose.

Figure 2:
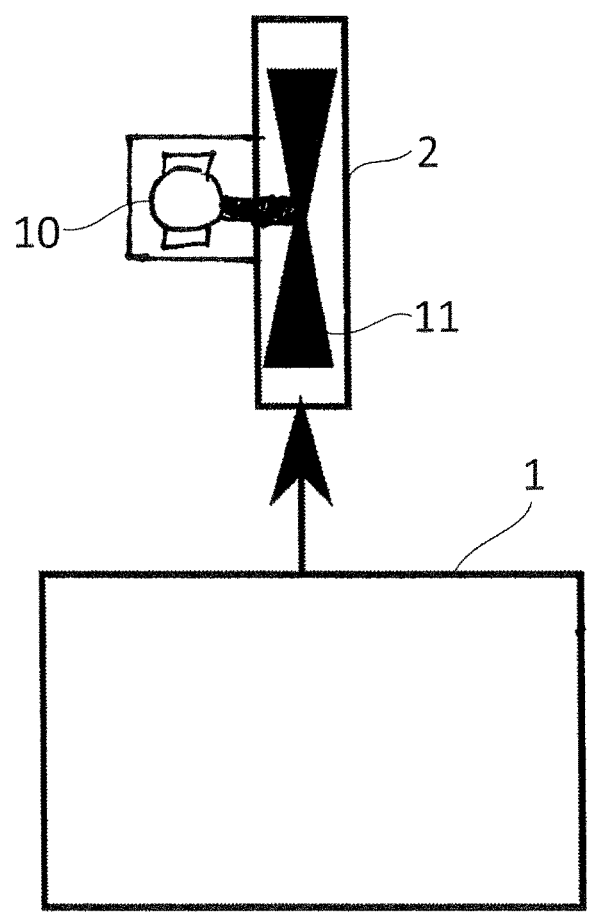
FIG. 2 is a block diagram of an exemplary embodiment of a radiator fan arrangement according to the invention.

FIG. 2 is a block diagram of an exemplary embodiment of a radiator fan arrangement 2 according to the invention.

The radiator fan arrangement in FIG. 2 has a control device 1 according to the invention which is designed to control a radiator fan 2. The radiator fan 2 has an electromotor 10 and an impeller 11.

In other embodiments, the radiator fan arrangement can be installed in a motor vehicle and connected to a digital vehicle bus of the vehicle. In such an embodiment, the control device 1 receives the predetermined desired variable 5 via the vehicle bus in the form of digital data.

Figure 3:
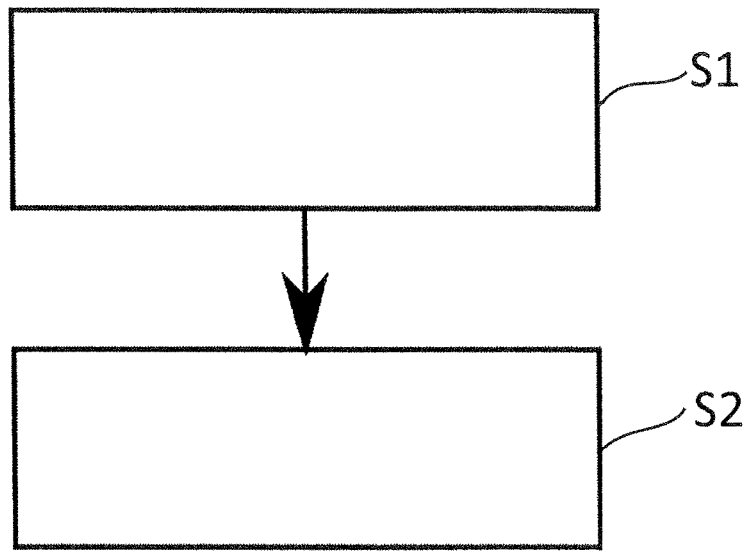
FIG. 3 is a flow diagram of an exemplary embodiment of a method according to the invention.

FIG. 3 shows a flow diagram of an exemplary embodiment of a method according to the invention.

In a first step S1, a controlled variable 4 for the electromotor 10 of the radiator fan 2 is generated according to the first predetermined desired value 5. In a second step S2, the motor current of the electromotor 10 of the radiator fan 2 is controlled in a closed-loop manner if the controlled variable 4 takes on such a value that the motor current exceeds a predetermined first maximum value for the motor current.

Figure 4:
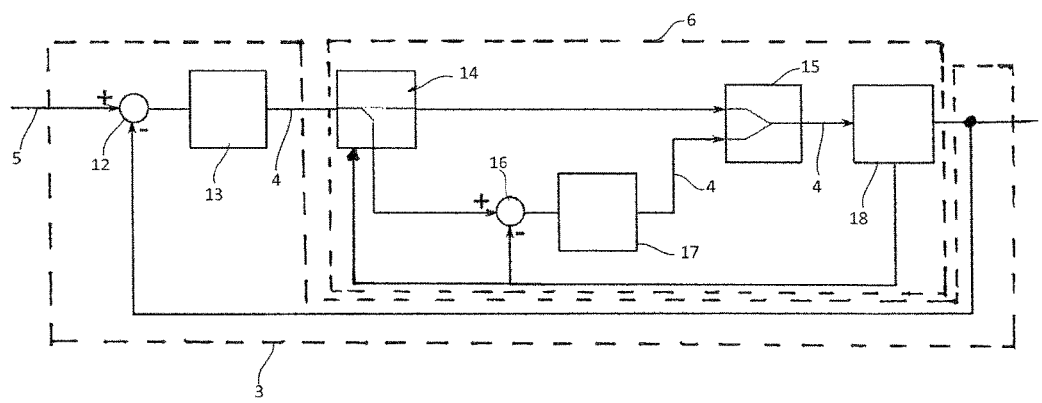
FIG. 4 is a block diagram of another exemplary embodiment of a control device according to the invention.

FIG. 4 is a block diagram of another exemplary embodiment of a control device 1 according to the invention.

The control device 1 in FIG. 4 also has an external closed-loop control device 4 and an internal closed-loop control device 6. Unlike FIG. 1, the external closed-loop control device 4 in FIG. 4 has a first summation unit 12 which obtains a desired speed 5 at a positive input and the current speed of a radiator fan 2 (not shown) at a negative input. The difference between the desired speed 5 and the current speed is fed to a closed-loop speed controller 13. On the basis of the difference between the desired speed 5 and the current speed, this controller generates a controlled variable 4. The controlled variable 4 can for example be an electrical voltage 4 to be fed to the electromotor 10.

The output of the closed-loop speed controller 13 is coupled to a decision unit 14 of the internal closed-loop control device 6. The decision unit 14 establishes whether the current intensity of the motor current of the electromotor 10 exceeds the predetermined first maximum value.

If the motor current is lower than the predetermined first maximum value, the decision unit 14 passes the controlled variable 4, which has been generated by the closed-loop speed controller 13, to the selection unit 15. Said selection unit is coupled to motor windings 18 of the electromotor 10 and transmits the controlled variable 4, e.g. the electrical voltage 4, to the motor windings 18.

If the current motor current is greater than the predetermined first maximum value, the decision unit 14 does not pass the controlled variable 4 to the selection unit 15. In this case, the decision unit 14 routes the predetermined first maximum value for the motor current to a positive input of a second summation unit 16. The second summation unit 16 obtains the current motor current intensity, flowing in the motor windings 18, at a second, negative input, and establishes the difference between the current motor current intensity and the predetermined first maximum value. This difference is fed to the closed-loop current controller 17 which generates the controlled variable 4 such that the motor current takes on a constant value. In this case, the constant value of the motor current corresponds to a current intensity that corresponds to the maximum permissible continuous current intensity of the power electronics of the control device 1.

The controlled variable 4 generated by the closed-loop current controller 17 is communicated to a second input of the selection unit 15. If the selection unit 15 receives a controlled variable 4 generated by the closed-loop current controller, the selection unit 15 does not communicate the controlled variable 4, which has been generated by the closed-loop speed controller 13, to the motor windings 18, but instead communicates the controlled variable 4 generated by the closed-loop current controller.

Figure 5:
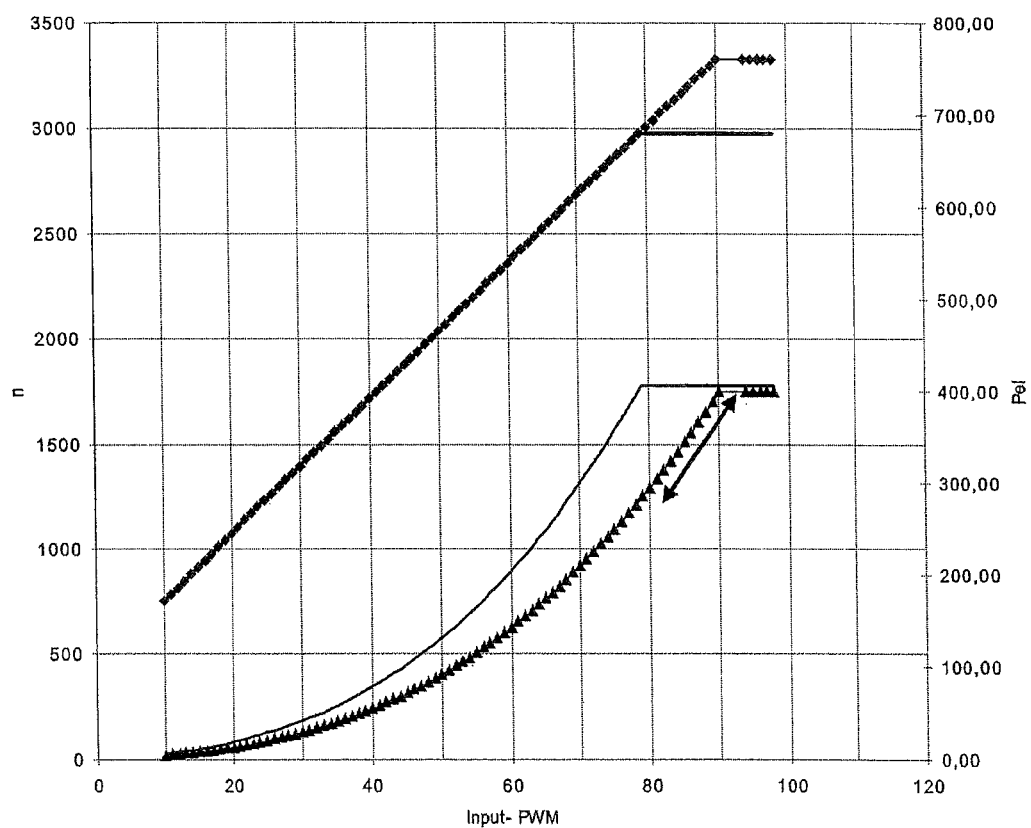
FIG. 5 is a graph showing two speed curves and two power curves, as they can be recorded in an embodiment of a radiator fan arrangement 2 according to the invention.

FIG. 5 is a graph showing two speed curves and two power curves, as they can be recorded in an embodiment of a radiator fan arrangement 2 according to the invention.

FIG. 5 is a graph in which the x-axis represents an input PWM signal, which represents the predetermined desired value 5. A first y-axis of the graph, shown on the left hand side of the graph, shows the speed in rpm from 0 to 3500. A second y-axis of the graph, on the right hand side of the graph, shows an electric power in watts.

The graph shows two speed curves. A first speed curve is shown as a smooth line; the second speed curve is shown by a line provided with diamonds. The speed curves start at 10% PWM at approximately 750 rpm and both increase linearly to 3000 rpm up to an input PWM signal of 80%. The first speed curve extends at 3000 rpm, without any further increase, up to an input PWM signal of 100%. The second speed curve increases further in a linear manner to 3400 rpm up to an input PWM signal of 90%. The second speed curve extends at 3400 rpm, without any further increase, up to an input PWM signal of 100%.

The graph also shows two power curves. The first power curve is shown by a smooth line and the second power curve is shown by a line provided with triangles.

The first power curve extends from 0 watts with a constantly increasing gradient from an input PWM signal of 0% up to an input PWM signal of 80% and a power of 400 watt. The first power curve extends, without any further increase, up to an input PWM signal of 100%.

The second power curve extends from an input PWM signal of 0% from 0 watt with a constantly increasing gradient, which, however, is smaller than that of the first curve, up to an input PWM signal of 90% and a power of 400 watt. The second power curve extends, without any further increase, up to an input PWM signal of 100%.

In the graph in FIG. 5, the two curves shown by a smooth line represent the behaviour of a radiator fan arrangement 2 according to the invention at room temperature and an altitude of 0 m above sea level. Additionally, all the curves represent the behaviour of a control device 1 according to the invention, which can emit a maximum continuous output power of 400 watt.

If a control device 1 according to the invention is operated at room temperature, the output power reaches the maximum value of 400 Watt as early as at 3000 rpm. However, if the input PWM signal increases further, the current is controlled to a constant value by the internal closed-loop control device 6, so that the output power of the control device 1 does not exceed 400 watt.

The curves provided with diamonds or triangles represent the behaviour of a radiator fan arrangement 2 according to the invention at high temperatures or in thin air, e.g. if the radiator fan arrangement is operated at altitude. It can be seen from the graph that, owing to the lower density of the air moved by the radiator fan arrangement, the electric power required to reach a certain speed is lower than at room temperature.

Typically, the speed is limited to the speed at which the radiator fan arrangement requires the maximum possible electric power at room temperature and 0 m above sea level. However, if such a radiator fan arrangement is operated at higher temperatures, i.e. with less dense air, the air mass required cannot be conveyed, since this requires a higher speed at lower air densities. If the engine threatens to overheat, an emergency operating mode is activated, whereby the radiator fan arrangement rotates at an increased speed.

However, instead of limiting the speed at 3000 rpm and only activating an emergency operating mode at a speed of 3400 rpm when the engine is threatening to overheat, a control device 1 according to the invention allows the speed to increase linearly up to the maximum speed of 3400 rpm and to restrict the output power only at that point.

The power range, in which a radiator fan arrangement according to the invention can additionally be controlled in a linear manner, is shown on the graph by an arrow next to the second power curve. The arrow begins at 80% PWM and extends up to 90% PWM next to the second power curve.

Although the present invention has been described above with reference to preferred embodiments, it is not limited thereto, but may be modified in a number of ways.

LIST OF REFERENCE NUMERALS

1 Control device
2 Radiator fan
3 (External) closed-loop control device
4 Controlled variable
5 Desired value
6 (Internal) closed-loop control device
10 Electromotor
11 Impeller
12 Summation unit
13 Closed-loop speed controller
14 Decision unit
15 Selection unit
16 Summation unit
17 Closed-loop current controller
18 Motor windings.

The invention claimed is:

1. A control device for a radiator fan, comprising:
an external closed-loop control device designed to generate a controlled variable for an electromotor of the radiator fan according to a first predetermined desired value,
an internal closed-loop control device designed for the closed-loop control of the motor current of the electromotor of the radiator fan, according to a predetermined first motor current maximum value, when the controlled variable generated by the external closed-loop control device takes on a value such that the motor current exceeds the predetermined first motor current maximum value;
characterized in that the control device has a second maximum value which presets the maximum value that can be set of the controlled variable, the radiator fan being designed such that, at room temperature, the motor current of the electromotor increases to the first maximum value before the electromotor reaches such a speed as is necessary to set the second maximum value with the radiator fan, the first predetermined desired value being generated according to the temperature and/or height above sea level and/or the ambient air density.

2. The control device of claim 1,
wherein the predetermined desired value designates a desired speed and in that the external closed-loop control device is designed as a closed-loop speed controller having a speed detection means designed to detect a speed of the electromotor.

3. The control device of claim 1, wherein the predetermined desired value designates a desired air volume and in that the external closed-loop control device is designed as a closed-loop air volume controller having an air volume detection means designed to detect an air volume of the radiator fan.

4. The control device of claim 1,
wherein the internal closed-loop control device is designed as a closed-loop current controller having a current sensor designed to detect the motor current of the electromotor, the internal closed-loop control device further being designed to control the motor current to a constant value such that a current consumed by the electromotor is lower than a maximum permissible current for the power electronics of the control device.

5. The control device of claim 1,
wherein the control device has a PWM interface or a data interface, which is designed to couple the control device to other vehicle control devices and to pick up the desired value from at least one other vehicle control device.

6. The control device of claim 5, wherein the control device has a CAN bus interface or a FlexRay interface or an LIN bus interface.

7. The control device of claim 1, wherein the radiator fan is a radiator fan of a motor vehicle.

8. A radiator fan arrangement, comprising:
a radiator fan having an impeller and an electromotor (10) for driving the impeller, and a control device which is coupled to the radiator fan and designed to control the electromotor of the radiator fan, the control device comprising:
an external closed-loop control device designed to generate a controlled variable for an electromotor of the radiator fan according to a first predetermined desired value, and an internal closed-loop control device designed for the closed-loop control of the motor current of the electromotor of the radiator fan, according to a predetermined first motor current maximum value, when the controlled variable generated by the external closed-loop control device takes on a value such that the motor current exceeds the predetermined first motor current maximum value;
characterized in that the control device has a second maximum value which presets the maximum value that can be set of the controlled variable, the radiator fan being designed such that, at room temperature, the motor current of the electromotor increases to the first maximum value before the electromotor reaches such a speed as is necessary to set the second maximum value with the radiator fan, the first predetermined desired value being generated according to the temperature and/or height above sea level and/or the ambient air density.

9. A method for controlling a radiator fan of a motor vehicle, comprising:
generating a controlled variable for an electromotor of the radiator fan according to a first predetermined desired value;
controlling, in a closed-loop manner, the motor current of the electromotor of the radiator fan according to a predetermined first motor current maximum value, when the controlled variable takes on such a value that the motor current exceeds the predetermined first motor current maximum value;

characterized in that a second maximum value is preset, which presets the maximum value that can be set of the controlled variable, the motor current of the radiator fan increasing at room temperature to the first maximum value, when the controlled variable is generated before the controlled variable is controlled to the second maximum value.

10. The method according to claim 9, wherein
the predetermined desired value designates a desired speed and in that the controlled variable designates a speed, a speed of the radiator fan being detected in order to generate the controlled variable.

11. The method according to claim 9, wherein
the predetermined desired value designates a desired air volume and in that the controlled variable designates an air volume, an air volume of the radiator fan being detected in order to generate the controlled variable.

12. The method according of claim 9, wherein
during closed-loop control of the motor current, the motor current is controlled to a constant value, a power consumed by the electromotor being lower than a maximum permissible power for the power electronics of the control device actuating the electromotor.

* * * * *